US012097156B2

(12) United States Patent
Anagnostakis et al.

(10) Patent No.: US 12,097,156 B2
(45) Date of Patent: Sep. 24, 2024

(54) SHEET HOLDING ARRANGEMENT AND A PATIENT TRANSFER DEVICE

(71) Applicant: NJORD INTERNATIONAL AB, Gothenburg (SE)

(72) Inventors: Georgios Anagnostakis, Mölndal (SE); Agnes Söder, Gothenburg (SE); Jacob Ahrnstein, Gothenburg (SE); Barbro Cagner, Alingsås (SE)

(73) Assignee: NJORD INTERNATIONAL AB, Gothenburg (SE)

( * ) Notice: Subject to any disclaimer, the term of this patent is extended or adjusted under 35 U.S.C. 154(b) by 0 days.

(21) Appl. No.: 18/479,112

(22) Filed: Oct. 2, 2023

(65) Prior Publication Data

US 2024/0024182 A1 Jan. 25, 2024

Related U.S. Application Data

(63) Continuation-in-part of application No. PCT/SE2022/050307, filed on Mar. 29, 2022.

(30) Foreign Application Priority Data

Apr. 1, 2021 (SE) .................................... 2150421-2
Mar. 29, 2022 (WO) ................. PCT/SE2022/050307

(51) Int. Cl.
*A61G 7/10* (2006.01)

(52) U.S. Cl.
CPC .................................. *A61G 7/1026* (2013.01)

(58) Field of Classification Search
None
See application file for complete search history.

(56) References Cited

U.S. PATENT DOCUMENTS 2,093,231 A 9/1937 Broadwell
2,745,163 A 5/1956 Van Buren, Jr.
(Continued)

FOREIGN PATENT DOCUMENTS

EP 1584252 A1 12/2005
JP 2002209943 7/2002
(Continued)

OTHER PUBLICATIONS

Kristina Jern, International Search Report and Written Opinion in Related PCT Application PCT/SE2022/050307, Issued Apr. 27, 2022, Swedish Intellectual Property Office.
(Continued)

*Primary Examiner* — Adam C Ortiz
(74) *Attorney, Agent, or Firm* — Silver Legal LLC; Jarrett L. Silver

(57) ABSTRACT

A sheet holding arrangement for holding a sheet when transferring a patient placed on the sheet, comprising at least two knobs and at least two holder elements, where the sheet is held between the knobs and holder elements when connected to each other, where the holder element is provided with an opening adapted to allow insertion of the knob through the opening, where the sheet holding arrangement is connectable to a pulling arrangement, where the sheet holding arrangement comprises a connecting member provided with at least two knobs and where the stem comprises a circumferential groove having a shape that corresponds to a semi-circular end section of the holder element, such that the sheet is held between the groove and the semi-circular end section when the holder element is connected to the knob.

15 Claims, 10 Drawing Sheets

(56) References Cited

U.S. PATENT DOCUMENTS

| | | | | |
|---|---|---|---|---|
| 4,686,748 A | | 8/1987 | Kaivanto | |
| 5,033,170 A | | 7/1991 | Ewert | |
| 5,046,222 A | * | 9/1991 | Byers | D06F 55/00 24/459 |
| 5,168,605 A | * | 12/1992 | Bartlett | F16G 11/143 24/519 |
| 7,571,498 B2 | * | 8/2009 | Jewell | A61G 7/1046 5/81.1 R |
| 2006/0090258 A1 | | 5/2006 | Stryker et al. | |
| 2019/0125603 A1 | * | 5/2019 | Mahjoubi | A61G 7/1042 |

FOREIGN PATENT DOCUMENTS

| | | |
|---|---|---|
| WO | WO 1996/013239 | 5/1996 |
| WO | WO 2021006799 | 1/2021 |

OTHER PUBLICATIONS

European Search Report in App. No. EP 20 83 6045.3, Mailed Jun. 20, 2023, EPO (The Hague, Netherlands), Search Completed Jun. 12, 2023.

Takimoto, Ayana, Notice of Reasons for Refusal in Japanese Patent Application No. 2021-576922, Issued Jan. 29, 2024, Japanese Patent Office.

* cited by examiner

SHEET HOLDING ARRANGEMENT AND A PATIENT TRANSFER DEVICE

CROSS-REFERENCE TO RELATED APPLICATIONS

The present application is a bypass continuation-in-part under Section 111(a). It claims benefit of PCT Application No. PCT/SE2022/050307 filed Mar. 29, 2022, which claims priority to Swedish Patent Application No. 2150421-2 (SE), filed Apr. 1, 2021, all of which are incorporated by reference in their entirety.

TECHNICAL FIELD

The present invention relates to a patient transfer device.

BACKGROUND

In hospitals, care facilities, and other settings, certain situations require that patients are transported from one surface to an adjoining surface, such as from one bed to an adjoining bed or to an operating table. This manoeuvre may either be done manually, requiring the cooperation of several nurses or other professionals, or by means of a patient transfer device. Patient transfer devices configured to move a patient from one surface to another are generally known.

Specifically, a patient transfer device for transferring a patient placed on a movable sheet on a first hospital bed to a second, receiving hospital bed is known from US2006/090258. This patient transfer device comprises a base, a motor attached to the base, two straps connected to the motor such that these are retractable by means of the motor, and a clamping assembly releasably attachable to a sheet. Thus, the patient transfer device may be arranged on one side of a receiving hospital bed, opposite the first hospital bed, and connected to a sheet on which a patient lies. The clamping assembly may then be used in connection with the motor and the two straps to pull a sheet on which a patient lies from the first bed to the second, receiving bed.

WO9613239 discloses a patient transport system for transporting a patient from a bed to a stretcher or vice versa, using a bed sheet and a conveyor attached to the bed or the stretcher. The sheet is removably attached to the conveyor by a clip arrangement, where a flexible belt attaches the clip to the conveyor. The conveyor is operated manually by the use of a handle.

However, the use of many of these devices often involve labour intensive, time consuming and/or ergonomically challenging steps. There is therefore a need for an improved sheet holding arrangement.

SUMMARY

An object of the invention is therefore to provide an improved sheet holding arrangement. A further object is to provide an improved patient transfer device.

The solution to the problem according to the invention is defined by the sheet holding arrangement according to claim 1 and by the patient transfer device according to claim 11, which contains the sheet holding arrangement according to claim 1. The other claims contain advantageous embodiments and further developments of the sheet holding arrangement and the patient transfer device.

A sheet holding arrangement for attaching to and holding a sheet when moving the sheet and transferring a patient placed on the sheet, said sheet holding arrangement comprising at least two knobs and at least two corresponding holder elements, wherein the holder elements are connectable to the knobs so as to hold the sheet in place between the knobs and holder elements when connected, wherein each knob comprises a head and a stem, wherein the stem has a circular cross section and wherein the head is larger than the stem, wherein the holder element is provided with an opening adapted to allow insertion of the head through the opening and to allow connection of the holder element to the knob, and wherein the sheet holding arrangement is connected or connectable to a pulling arrangement configured to pull the holder elements and thereby move the sheet and thus transfer a patient placed on the sheet, the object of the invention is achieved in that the sheet holding arrangement comprises a connecting member, wherein the at least two knobs are arranged onto the connecting member at a distance from each other in a longitudinal direction of the connecting member, wherein the stem comprises a circumferential extending rounded groove, wherein the opening comprises a first portion that is larger than the head and a second portion that is smaller than the head, wherein the second portion comprises a straight section and a semi-circular end section, wherein the semi-circular end section has a rounded bulging surface with a shape corresponding to that of the rounded shape of the groove of the stem such that, when a sheet is placed above the knob and the corresponding holder element is connected to the knob with the sheet positioned between the knob and the holder element, and when the position of the holder element in relation to the knob is such that the stem is located as close as possible to the semi-circular end section of the second portion of the opening, the sheet is clamped between the rounded bulging surface and the rounded groove along the semi-circular end section.

By this first embodiment of the sheet holding arrangement according to the invention, a sheet holding arrangement that allows for a quick and reliable attachment of a sheet is provided. With such a sheet holding arrangement, a patient laying on a bed can be transferred from a first surface of the bed to a receiving surface by the use of a pulling arrangement. The sheet holding arrangement is easily attached to the sheet when the patient is positioned beside the receiving surface and will hold the sheet in a secure manner during the transfer of the patient. When the patient has been transferred, the sheet holding arrangement can easily be detached from the sheet and from the pulling arrangement. The shape of the contact surface between the holder element and the knob corresponds to each other and will provide a form-fit, which will enlarge the contact surface for the sheet. The larger contact surface will reduce the wear and stress on the sheet, and will prevent the sheet holding arrangement from slipping or tearing the sheet.

The opening of the holder element may further be provided with inner protrusions. The protrusions will help to secure the holder element to the knob and will provide a tactical feedback to an operator attaching a sheet to the sheet holding arrangement. With the protrusions, an operator is able to detect when a holder element is correctly positioned.

The connecting member of the sheet holding arrangement may be either a stiff rod-like member or may be a flexible wire or the like.

The holder element is provided with one or more slots adapted to attach the holder element to a knob of the sheet holding arrangement or to the connecting member of the sheet holding arrangement. The holder element is preferably attached with a ribbon or a string such that it does not fall off or disappears. The holder element further comprises a pulling opening to which a pulling wire can be attached with a hook, e.g. a safety hook. The sheet holding arrangement can thus easily be connected to and disconnected from a pulling arrangement. One advantage with this is that the sheet holding arrangement can be removed from the pulling arrangement, e.g. for cleaning, and that it can be used with different pulling arrangements. It is even possible to attach a handle to the sheet holding arrangement, such that a patient can be transferred manually. The pulling arrangement may also be used to pull other items, such as stretcher matrasses, trauma matrasses or other heavy items.

The sheet holding arrangement may be used in a patient transfer device comprising a pulling arrangement. The patient transfer device preferably comprises an electric motor that will transfer a patient from a bed to a receiving surface. The receiving surface may be another bed, or may e.g. be a resting surface in an X-ray, CT or MRI machine.

BRIEF DESCRIPTION OF DRAWINGS

The invention will be described in greater detail in the following, with reference to the embodiments that are shown in the attached drawings, in which.

DETAILED DESCRIPTION

The embodiments of the invention with further developments described in the following are to be regarded only as examples and are in no way to limit the scope of the protection provided by the patent claims.

Figure 1:
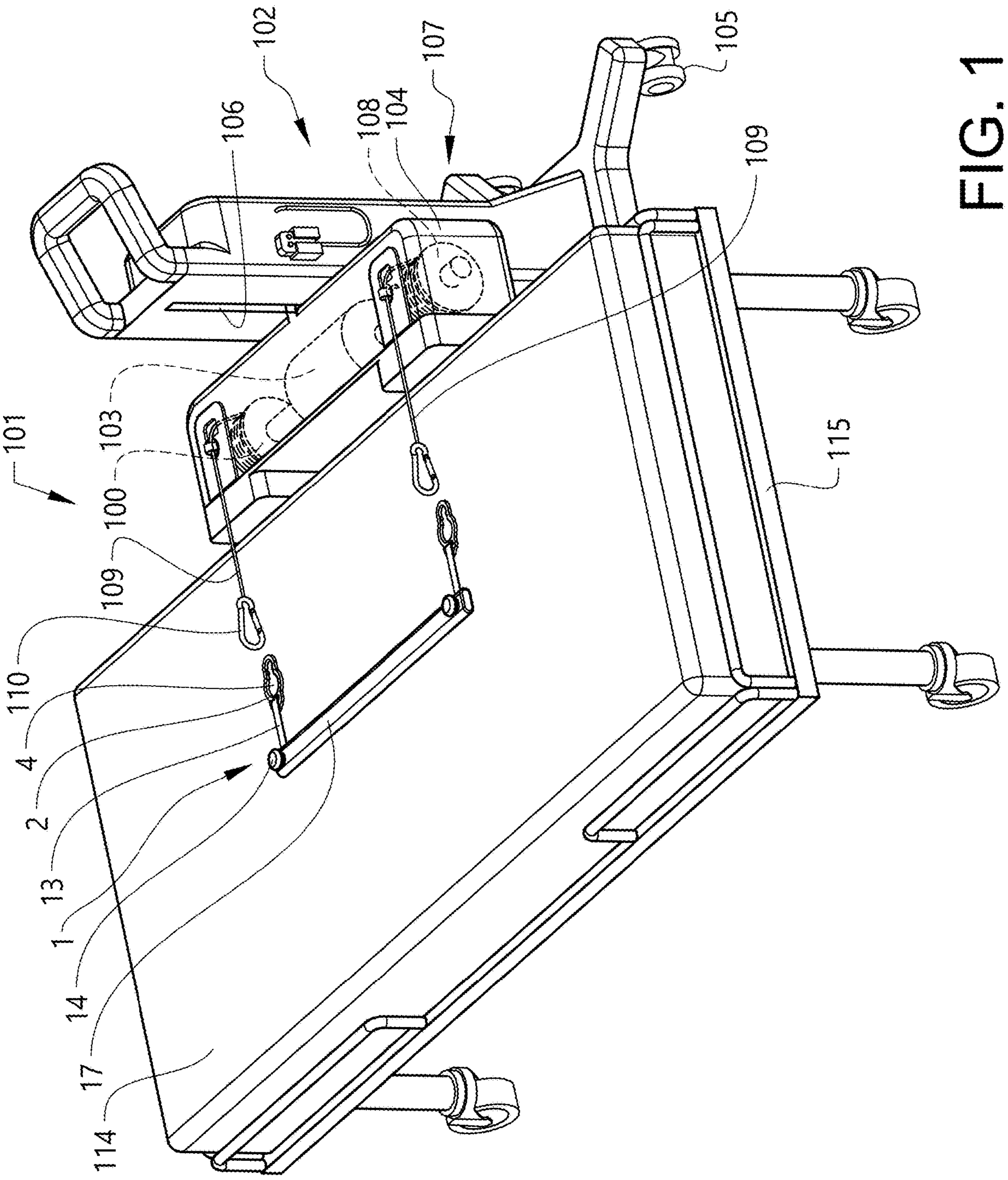
FIG. 1 shows a patient transfer device according to the invention.
Figure 3:
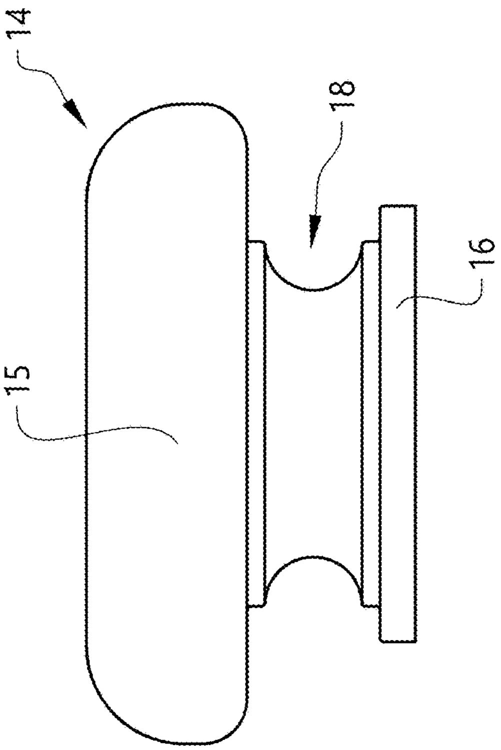
FIG. 3 shows a knob used in a sheet holding arrangement according to the invention.
Figure 2:
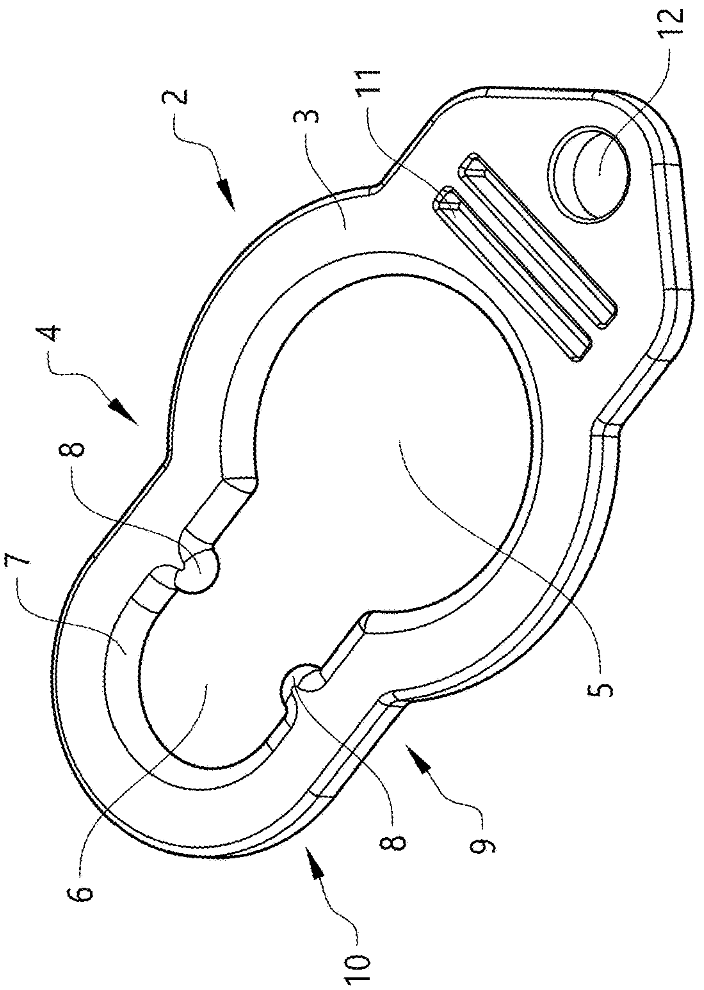
FIG. 2 shows a holder element used in a sheet holding arrangement according to the invention.
Figure 4B:
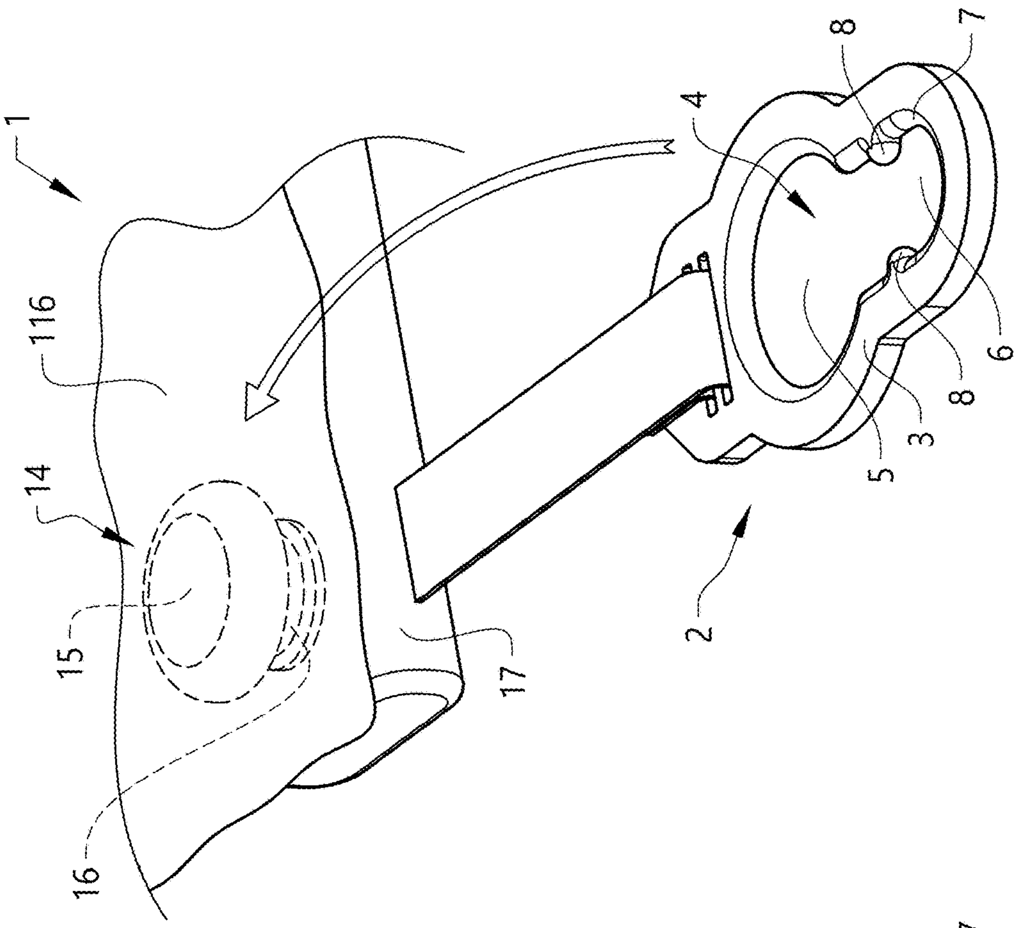
FIG. 4*b* shows the sheet holding arrangement with a sheet.
Figure 4A:
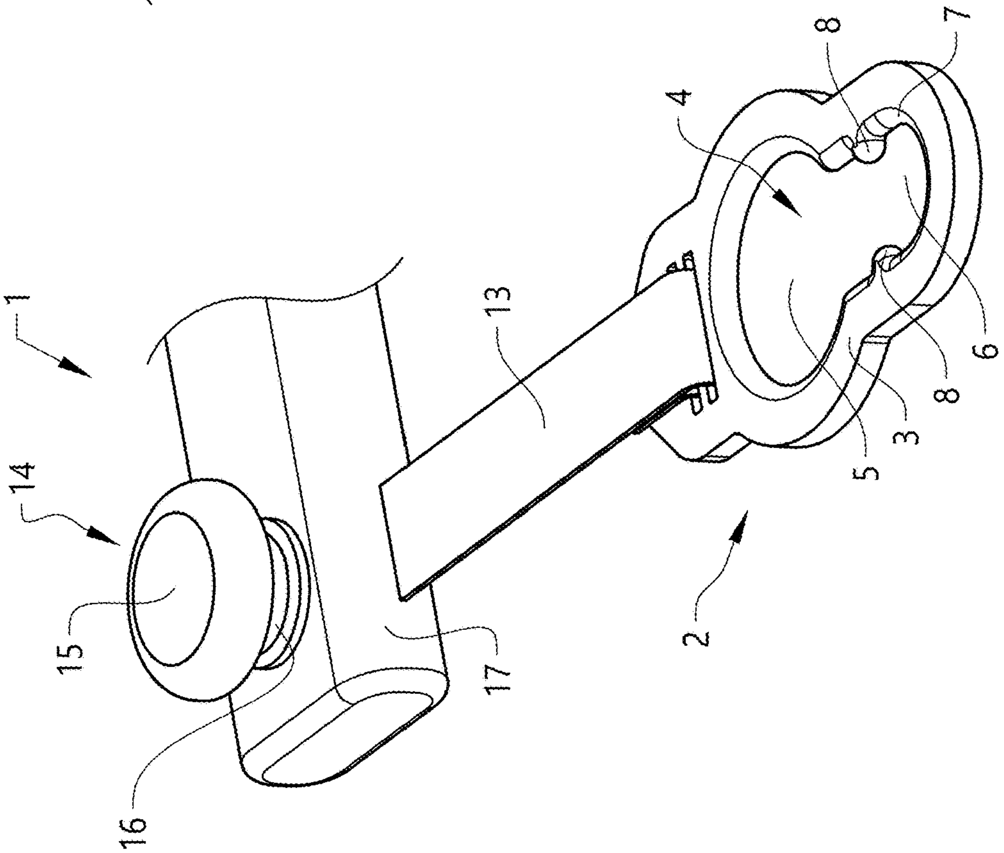
FIG. 4*a* shows the sheet holding arrangement in an unlocked state.
Figure 4D:
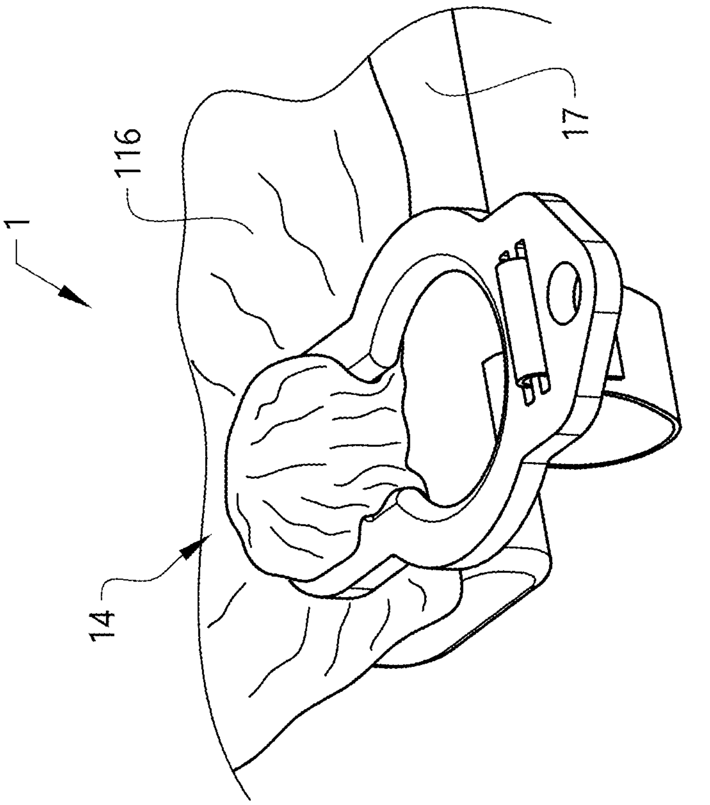
FIG. 4*d* shows the sheet holding arrangement in a locked state.
Figure 4C:
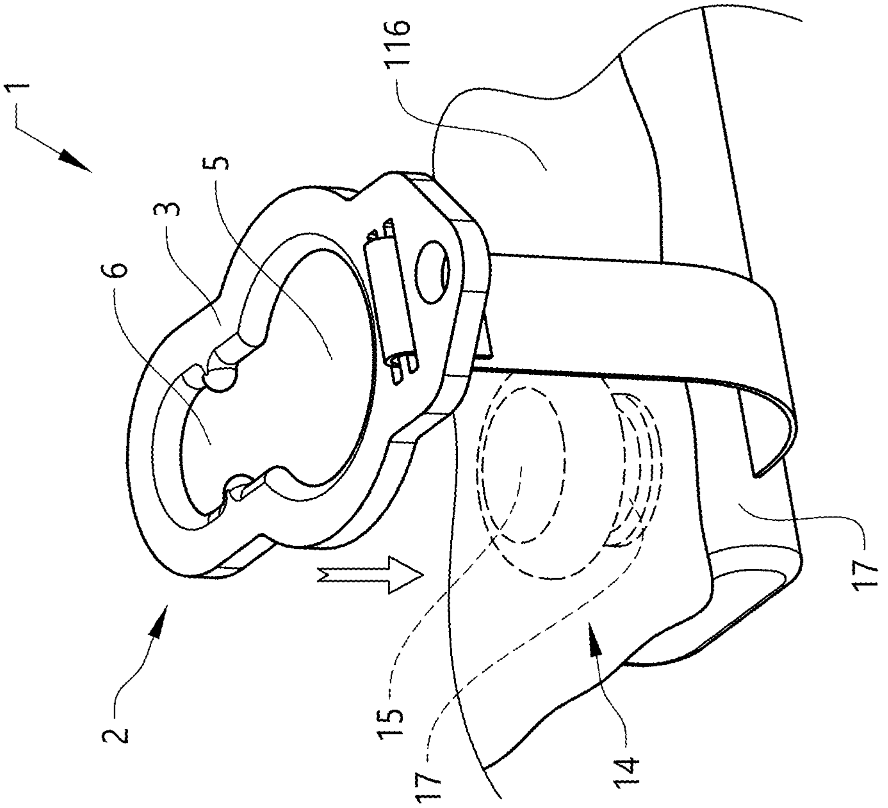
FIG. 4*c* shows the sheet holding arrangement before a locked state.
Figure 4E:
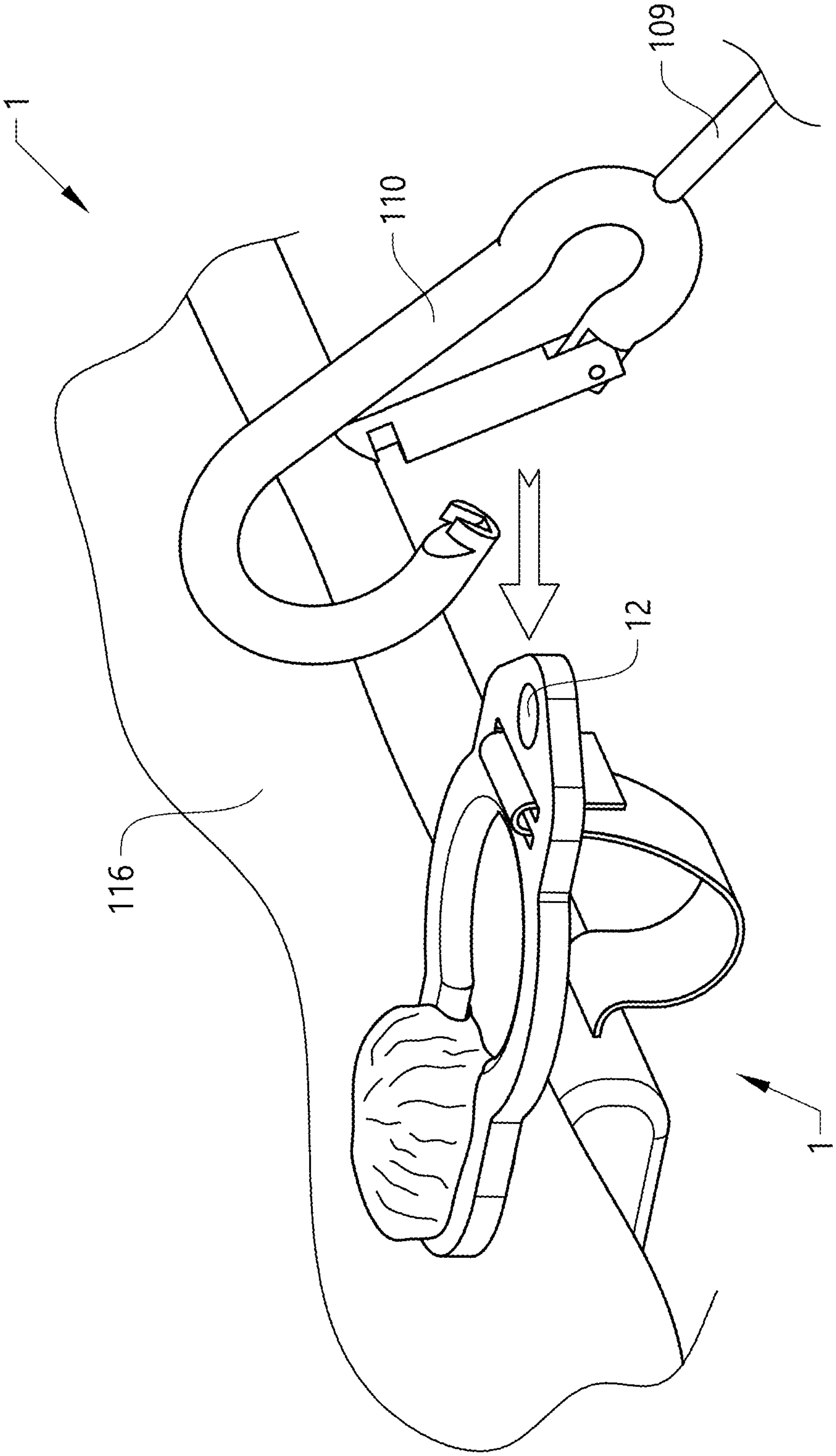
FIG. 4*e* shows a hook being attached to the sheet holding arrangement.
Figure 5A:
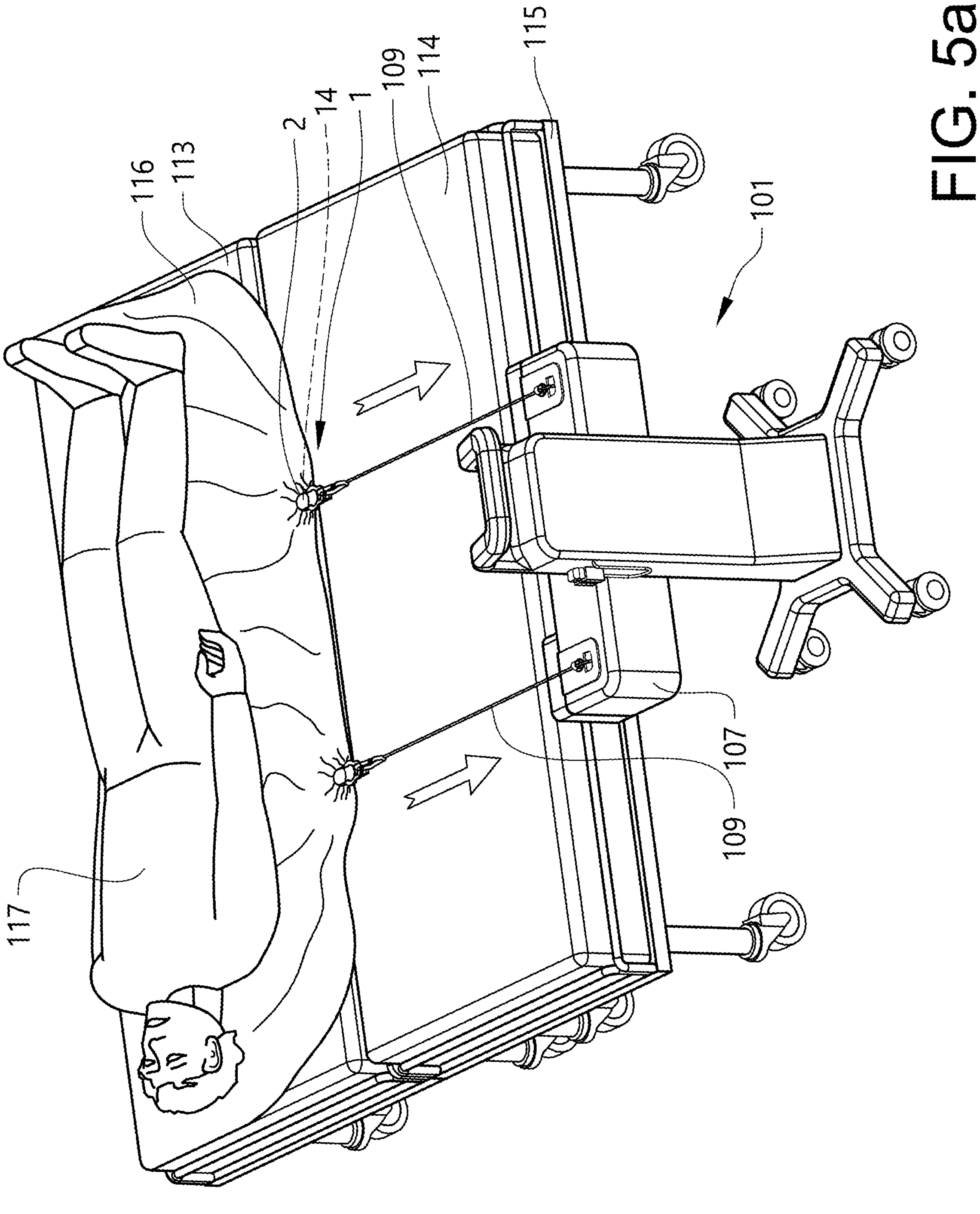
FIG. 5*a*, 5*b* shows the patient transfer device of FIG. 1 when used to transfer a patient from a first surface to a receiving surface.
Figure 5B:
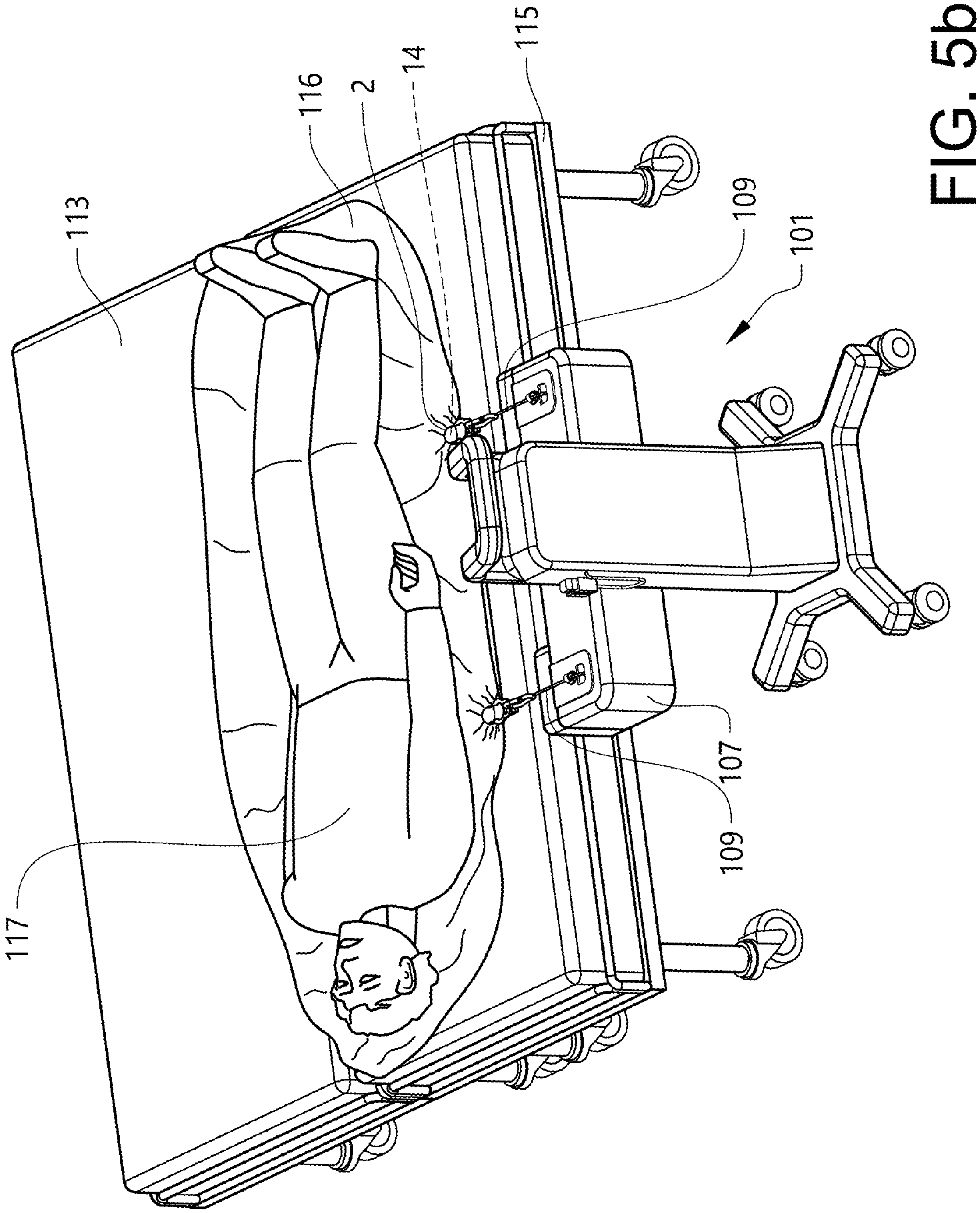
Figure 6:
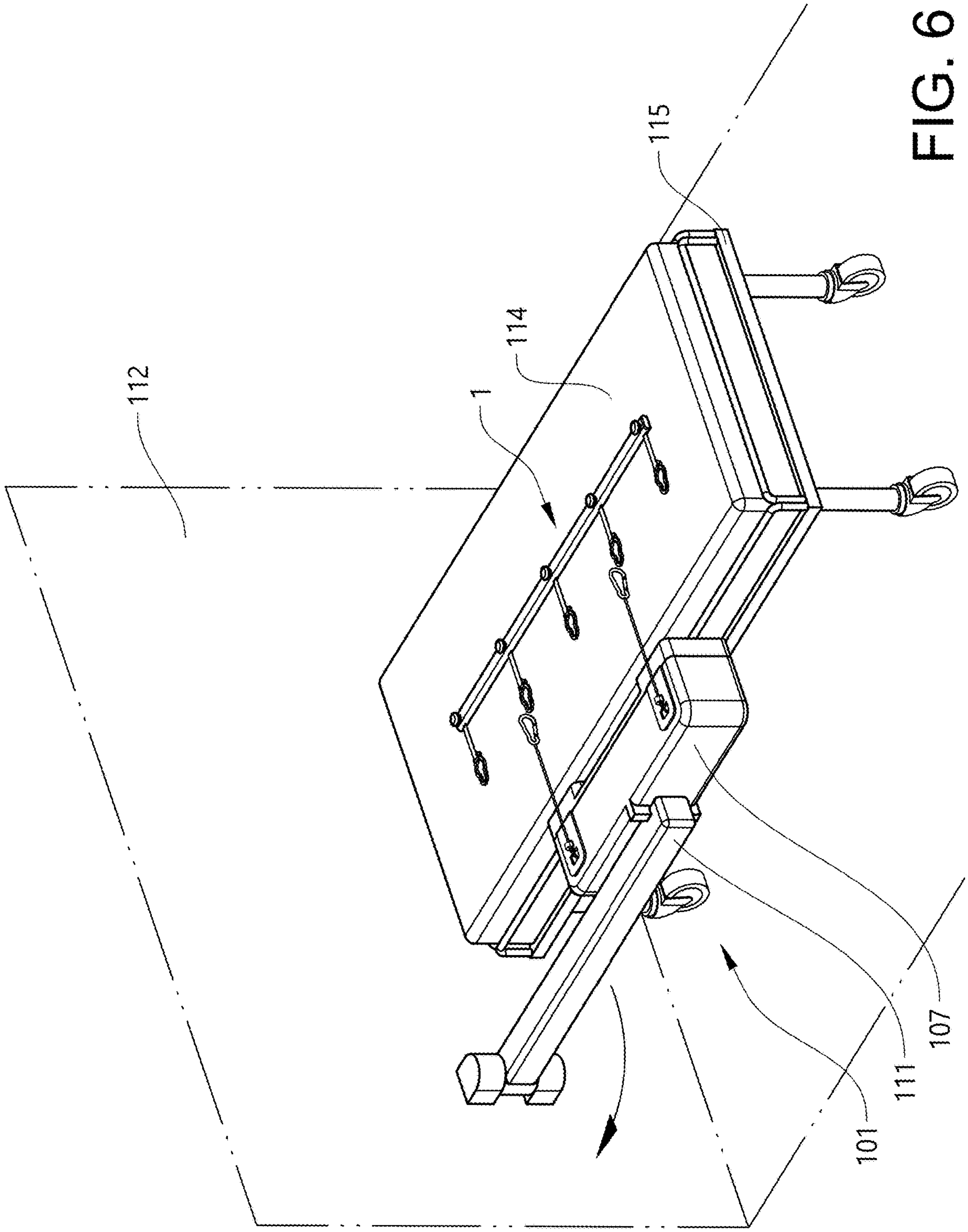
FIG. 6 shows a further example of a patient transfer device according to the invention.

FIG. 1 shows a view of a patient transfer device comprising a sheet holding arrangement according to the invention, FIGS. 2 and 3 show details of the sheet holding arrangement, FIGS. 4*a*-4*e* show the attachment of a sheet to the sheet holding arrangement, FIGS. 5*a*-*b* show a patient transfer device in use and FIG. 6 shows a second example of a patient transfer device.

The patient transfer device 101 shown in FIG. 1 comprises in the shown example a sheet holding arrangement 1, a pulling arrangement 107 and a frame 102, onto which the pulling arrangement 107 is attached. The frame 102 is arranged to be placed on a horizontal surface, such as a floor, and is provided with wheels 105 for moving the patient transfer device 101 across this surface. The pulling arrangement 107 comprises a motor 103 connected to two wire bobbins 108 and an outer casing 104 that covers and protects the motor 103 and the wire bobbins 108 from contamination caused by for example contact with dust or bodily fluids from a patient that is transferred using this patient transfer device 101. The outer casing may be removed completely or may be attached with hinges, such that the outer casing can be opened when the wire bobbins are to be cleaned or replaced. The casing may be provided with pads attached to the outer casing in a removable manner, such that they may be removed from the outer casing.

The shown patient transfer device 101 comprises means for vertically adjusting the position of the pulling arrangement 107. This may for example be an electrical motor (not shown) arranged in the frame 102 that can move the pulling arrangement 107 along a vertical track 106 or groove in the frame 102. This simplifies the use of the patient transfer device 101 in certain situations where the height of the receiving surface 114 may vary.

The motor 103 is coupled to two laterally spaced apart wire bobbins 108 that are used when pulling a patient from a first surface to a receiving surface. The pulling arrangement comprises a wire bobbin 108 provided with a wire 109 wound on the bobbin. The bobbin 108 is mechanically connected to the motor 103, either directly to the motor or to a shaft driven by the motor. The ends of the two wires 109 that are not connected to the bobbin 108 are provided with hooks 110 adapted to be attached to a sheet holding arrangement 1, which is provided with an elongated connecting member 17 and which is adapted to be attached to the respective ends of the wires 109.

The sheet holding arrangement 1 comprises an elongated connecting member 17, a plurality of knobs 14 and a plurality of holder elements 2. The connecting member 17 may be a stiff rod or may be a flexible wire of some kind. In the shown examples, a rod is used as the connecting member. The knobs are mounted on the rod in a spaced apart manner, in the shown example with a distance corresponding to the distance between the wire bobbins of the pulling arrangement 107. This will allow the pulling arrangement 107 to pull the sheet holding arrangement in a straight manner. A rod may be provided with more than two knobs, depending on e.g. the length of the rod or the size of a sheet. The rod allows the load from pulling a sheet on which a patient lies to be distributed to both wires 109. In the shown example, the rod is provided with two knobs arranged at the ends of the rod. A rod or a wire may also simplify the handling of the sheet holding arrangement, e.g. by allowing both wires 109 to be pulled out from the pulling arrangement at the same time. The connecting member will also ensure that the distance between the two knobs corresponds to the distance between the pulling wires of the pulling arrangement.

FIG. 2 shows an example of a holder element 2. The holder element is provided with a circumferential body 3 that is provided with a keyhole-shaped opening 4. The opening is provided with a first portion 5 and a second portion 6. The first portion is in the shown example circular, but other shapes are possible. The first portion is adapted to be threaded over a knob covered with a sheet, thus the size of the first portion is somewhat larger than the size of the head of a knob. The second portion 6 comprises a semi-circular end section 10 and a straight section 9. The edges of the straight section are parallel and interconnects the semi-circular end section with the first portion. The inner edge 7 of the semi-circular section is rounded and convex. The diameter of the rounded edge is in one example equal to the thickness of the holder element, but other rounded shapes are also possible. In one example, the holder element is 5 mm thick, and is preferably between 2 to 10 mm thick. The holder element 2 is flat.

FIG. 3 shows an example of a knob 14. The knob is provided with a head 15 and a stem 16. The stem is provided with a circumferential rounded groove 18 that is concave and that is adapted to cooperate with the semi-circular end section 10 of the holder element. The shape of the concave rounded groove 18 corresponds substantially to the shape of the convex inner edge 7 of the semi-circular end section 10. The height of the groove 18 equals in one example the thickness of the holder element 2, but may also be slightly smaller. The diameter of the groove is somewhat smaller than the diameter of the semi-circular end section. The size difference between the groove and the semi-circular end section allows a sheet to be clamped between the groove and the semi-circular end section in a secure manner with a tight fit. In this way, a sheet will be clamped between the entire inner edge of the semi-circular end section and the groove, which will provide a relatively large contact surface and will reduce the risk of the sheet slipping or ripping during the transfer of a patient from one surface to another surface.

The width of the second portion, i.e. the distance between the edges of the straight section and also the diameter of the semi-circular section is for this reason slightly larger than the rounded groove of the stem. In one example, the width of the second section is 21 mm and the diameter of the groove is 15 mm. This will allow a sheet to be clamped between the semi-circular end section and the groove in a secure and tight manner, which will reduce the contact load on the sheet. Other measures are possible, but tests has shown that a size difference between the width of the second section and the diameter of the groove in the region between 15-30% gives a secure hold of a sheet for smaller knobs having a diameter of a few centimetres. This will give space for more than one layer of a sheet, since the sheet will not be folded evenly over the knob when it is attached to the sheet holding arrangement.

The knob is preferably made in a stiff material, such as a reinforced plastic. The holder element is preferably somewhat resilient, and may be made from an elastic plastic or rubber. It is of advantage that both the holder element, the knob and the connecting member are all made from a material that is transparent to electromagnetic waves. This will give low to zero disturbance of the applicability, interoperability, and output of radiating machines in hospital environments. In this way, the sheet holding arrangement may not have to be removed when a patient is examined with radiation.

The holder element further comprises one or more strap slots 11 adapted to attach the holder element to the knob or the connecting member. This will prevent the holder element from disappearing and will ensure that a holder element is always at hand. The holder element is in one example attached with a flexible ribbon 13. The ribbon may be fixedly attached to the holder element or may be attached to the holder element in a removable manner, such that the holder element can be replaced if damaged. The ribbon may be attached to the knob or connecting member in a removable manner, such that the ribbon can be replaced. The knob is in one example mounted to a rod with a screw, and the ribbon is mounted between the knob and the rod.

The holder element is adapted to be attached to a pulling arrangement 107. In the shown example, the holder element is provided with a pulling opening 12 arranged at one end of the holder element, the end opposite the semi-circular end section. The pulling opening may e.g. be attached to the pulling arrangement by a hook, e.g. a safety hook. In this way, the attachment and detachment of the holder element to and from the pulling arrangement can be made in a quick manner. The holder element can also be provided with a hook element and the wire of the pulling arrangement can be provided with a loop element. Since the pulling opening 12 is arranged in the same plane as the semi-circular end section, the pulling forces acting on the sheet will be parallel to the pulling wires of the pulling arrangement. There will thus not be any misalignment of the sheet holding arrangement during transfer of a patient.

The straight section 9 of the holder element is in the shown example provided with inner protrusions 8. The protrusions will help to secure the holder element to the knob when holding a sheet and will provide a tactical feedback to an operator attaching a sheet to the sheet holding arrangement. With the protrusions, an operator is able to detect when a holder element is correctly positioned and that a sheet is clamped between the semi-circular end section and the groove. In one example, the distance between the protrusions equals the diameter of the groove. Thus, an empty knob will not give any resistance when the holder element is mounted to the knob. When a sheet is wrapped on the knob, the knob with the sheet will give a tactical feedback to an operator.

FIGS. 4*a*-4*e* illustrates the attachment of a sheet to a sheet holding arrangement where the connecting member is a rod. Here, the attachment of a sheet 116 to one knob 14 of the sheet holding arrangement 1 is shown.

FIG. 4*a* shows part of a sheet holding arrangement with a knob and a holder element in an unlocked state. In FIG. 4*b*, a sheet 116 is placed on top of the knob 14 of the sheet holding arrangement 1. The holder element is moved towards the knob with the sheet. In FIG. 4*c*, the holder element is positioned above the knob and is pushed down with the first portion 5 of the opening 4 extending over the head 15 of the knob. The sheet will at the same time be pushed down over the knob and will be drawn together somewhat by the opening.

In FIG. 4*d*, the knob and the holder element is in a locked state. The second portion 6 of the opening 4 has been pulled towards the knob such that the semi-circular end section 10 of the holder element is close to the groove 18, and such that the sheet is pressed and held between the semi-circular end section and the groove in a tight manner. The protrusions 8 have passed the centre of the knob and helps to hold the holder element in place. In FIG. 4*e*, a hook 110 of a pulling arrangement is attached to the pulling opening 12 of the holder element.

FIGS. 5*a*-5*b* show perspective views illustrating the use of the patient transfer device 101 in transferring a patient 117 from a first surface 113, in the illustrated case of a first bed, to a receiving surface 114, in the illustrated case of a receiving bed 115. In FIG. 5*a*, the patient 117 is lying on a sheet 116 on the first bed, and the sheet holding arrangement 1 of the patient transfer device 101 is connected thereto. The receiving bed 115 is arranged side-by-side with the first bed, and the patient transfer device 101 is arranged on the opposite side of the receiving bed than the first bed. In FIG. 5*b*, the motor 103 of the patient transfer device 101 casus the retraction of the sheet holding arrangement 1 towards the patient transfer device 101 and the first bed 115. This causes a pulling force on the sheet 116 on which the patient 117 lies. Thus, the patient 117 is transferred from a first surface 113 to a receiving surface 114.

FIG. 6 shows a perspective view of a patient transfer device according to another aspect of the present invention. Here, the pulling arrangement 107 of the patient transfer device 101 is mounted on an adjustable movable arm 111 that is mounted to a wall 112. It should be understood that the movable arm 111 may alternatively extend from a ceiling mount instead of a wall mount, and that the number of joints on the arm may vary. In the shown example, the sheet holding arrangement 1 comprises five knobs 14 and five holder elements 2 arranged on a longer rod 17. Two knobs are as described above arranged with a distance corresponding to the distance between the wire bobbins of the pulling arrangement 107. This will allow the pulling arrangement 107 to pull the sheet holding arrangement in a straight manner. One knob is arranged between the two knobs used for pulling the sheet holding arrangement and two knobs are arranged at the outer ends of the rod. The use of more knobs may distribute the load on the sheet more evenly, which may be of advantage when heavier patients are to be transferred.

Figure 7A:
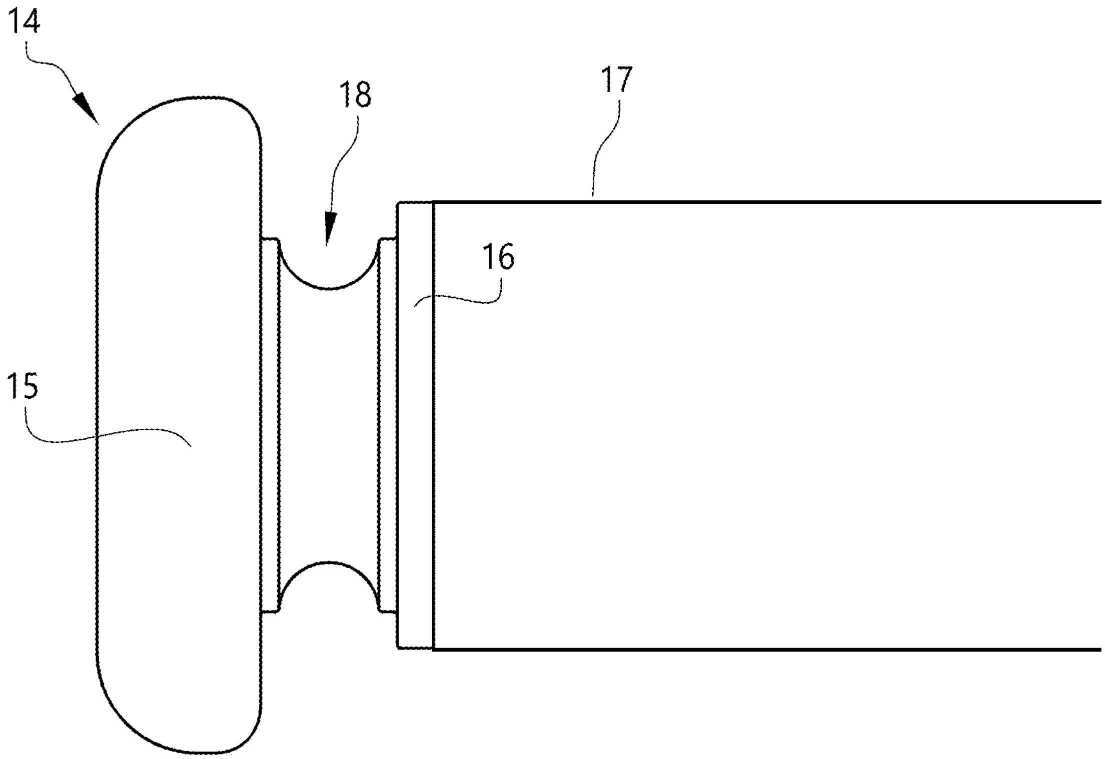
FIG. 7*a* shows a side view of a connecting member having inline knobs in another example of a sheet holding arrangement.
Figure 7B:
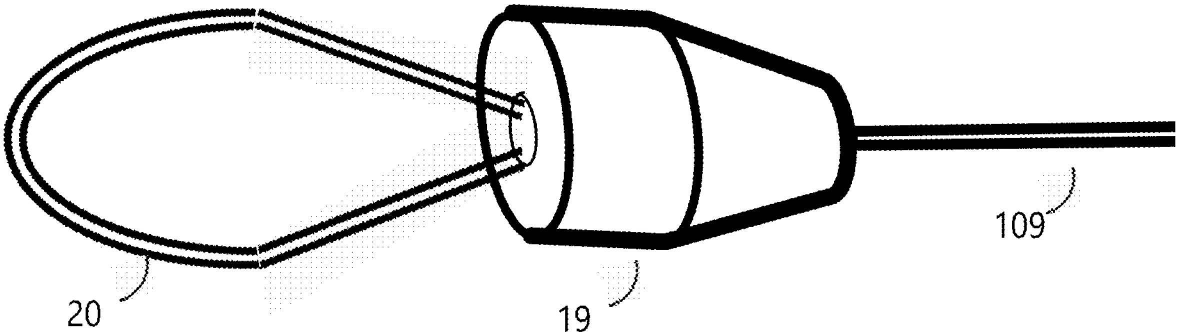
FIG. 7*b* shows a side view of a wire joiner in this example of a sheet holding arrangement.
Figure 7C:
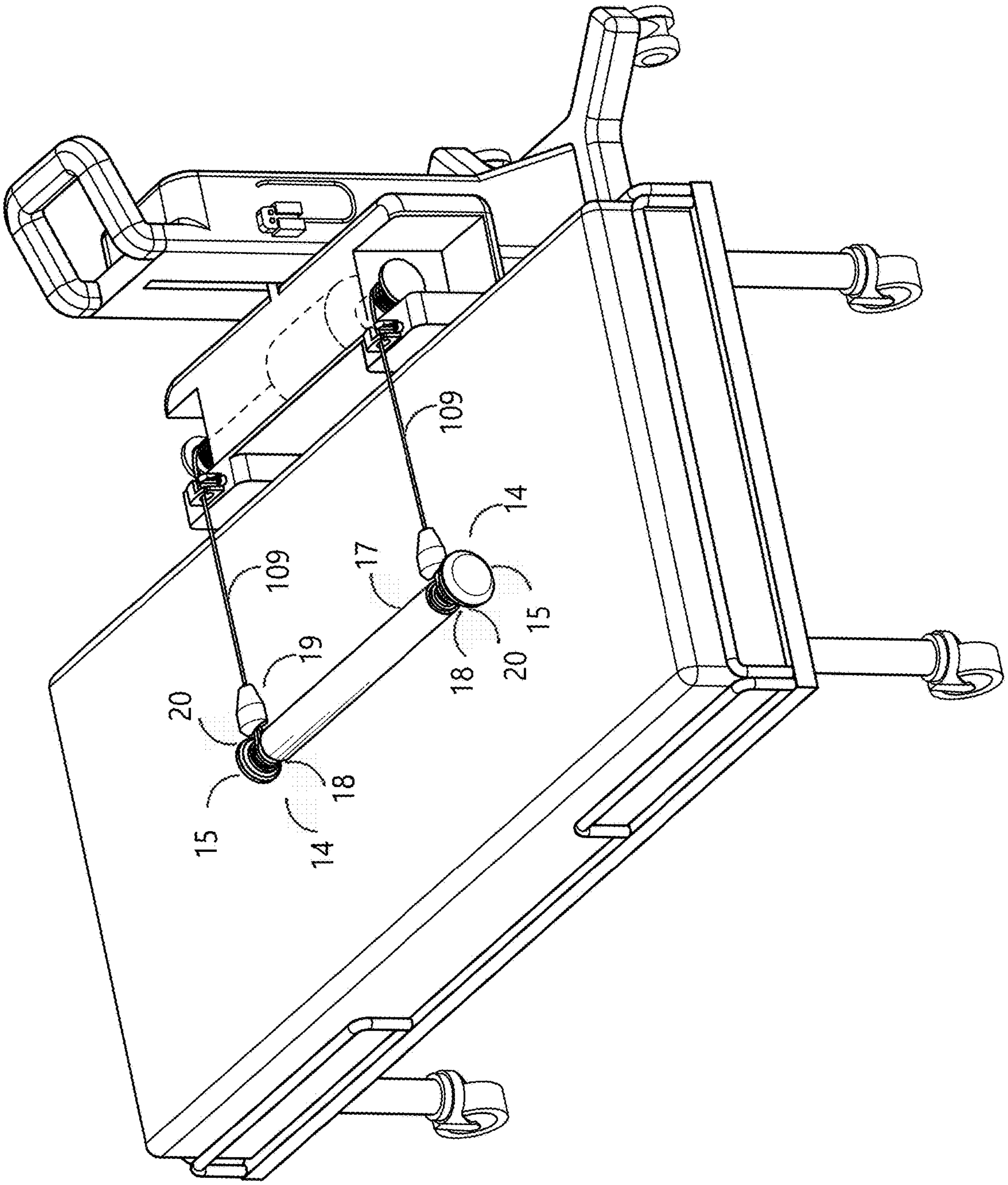
FIG. 7*c* shows this example of the sheet holding arrangement as part of the patient transfer device.

FIG. 7*a*-7*c* show another example embodiment. This embodiment has a similar knob 14 and groove 18 arrangement as that of FIG. 3 for connecting to a sheet. In this embodiment, the knobs are shown inline on the ends of a connecting member 17 and directly attach to the wire 109 in a recessed area between head 15 and stem 16 that optionally may include groove 18 for additional control. The knobs 14 are located directly on the axis of the connecting member 17 opposite each other on the farthest ends of the connecting member 17. Similar to FIGS. 4*a*-4*d*, the knobs can be used in a locked and unlocked state for holding a sheet. A benefit of the knobs being inline with a body of the connecting member 17 is a simpler and more economical design. It is also understood that the in-line knob arrangement in this embodiment could be used together with all or parts of the other embodiments herein, such as FIG. 1-positioned knobs 14, holder element 2, hook 100, ribbon 13, moveable arm 111, etc.

Wire joiner 19 provides a mechanism for mechanically coupling an attachment to the connecting member 17 with the wire 109 to be able to pull the wire 109 attached to the connecting member 17 towards the pulling arrangement 107. In the simplest version, the wire 109 can loop around and be fused, fastened, adhered, and/or welded to itself to form a loop 20 extending out from the wire joiner 19. The loop 20 can be part of wire 109 or a separate material to connect the connecting member 17 to the wire 109 through the wire joiner 19. In other embodiments, the loop 20 can be a hook, tie, fastener, or other type of attachment that is able to mechanically couple the connecting member 17 to the wire 109 in way that is capable to pull the wire 109 attached to the connecting member 17 with the expected load towards the pulling arrangement 107. It is understood that the attachment areas for the wire pulling force or the sheet pulling force could be in more locations on or off the axis of the connecting member 17 than only the ends of the connecting member 17.

The invention is not to be regarded as being limited to the embodiments described above, a number of additional variants and modifications being possible within the scope of the subsequent patent claims. The sheet holding arrangement may be used to attach and hold any type of thin fabric or cloth.

There has thus been outlined, rather broadly, some of the features of the sheet holding arrangement and patient transfer device their use herein in order that the detailed description thereof may be better understood, and in order that the present contribution to the art may be better appreciated.

It will be apparent to those skilled in the art that various modifications and variations can be made to the disclosed sheet holding arrangement and patient transfer device, systems, materials, constructions, methods, and components herein. Other embodiments will be apparent to those skilled in the art from consideration of the specification and practice of the disclosed inventions. Numerous modifications, changes, variations, substitutions, and equivalents will occur to those skilled in the art without departing from the spirit and scope of claimed invention. It is intended that the specification and examples be considered as exemplary only, with a true scope being indicated by the claims, as later amended, and their equivalents. The benefits, advantages, solutions to problems, and any element(s) that may cause any benefit, advantage, or solution to occur or become more pronounced are not to be construed as a critical, required, or essential features or elements of any or all the claim, unless asserted as such by Applicant's remarks in the record. Accordingly, the specification and figures are to be regarded in an illustrative rather than a restrictive sense, and all such modifications are intended to be included within the scope of the claimed invention. Likewise, it is to be understood that the phraseology and terminology employed herein are for the purpose of the description and should not be regarded as limiting.

Regarding additional interpretation and construction of terms and steps herein, method steps are not in any specified order unless dictated by the context or specific wording. In addition, a use of a word in the singular form should be interpreted where the context allows, or does not restrict, so as to enable plurality or an "at least one" construction. Positional and directional terms described in this specification may be understood to be different than shown or described, and should not limit the variations of embodiments possible from the claimed features that a person of ordinary skill in the art would understand from the specification, figures and claims. The term "and/or" in a list means all list items present, some list items present, or one of the list items present, unless such construction is limited by the context. The term "including" means "including, but not limited to."

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

REFERENCE SIGNS

1: Sheet holding arrangement
2: Holder element

3: Body
4: Opening
First portion
6: Second portion
7: Inner edge
8: Inner protrusion
9: Straight section
10: Semi-circular section
11: Strap slot
12: Pulling opening
13: Ribbon
14: Knob
15: Head
16: Stem
17: Connecting member
18: Groove
19: Wire Joiner
20: Loop
101: Patient transfer device
102: Frame
103: Motor
104: Casing
105: Wheel
106: Vertical track
107: Pulling arrangement
108: Bobbin
109: Wire
110: Hook
111: Arm
112: Wall
113: First surface
114: Receiving surface
115: Bed
116: Sheet
117: Patient

The invention claimed is:

1. A sheet holding arrangement for attaching to and holding a sheet when moving the sheet and transferring a patient placed on the sheet, said sheet holding arrangement comprising: at least two knobs and at least two corresponding holder elements, wherein the holder elements are connectable to the knobs so as to hold the sheet in place between the knobs and holder elements when connected, wherein each knob comprises a head and a stem, wherein the stem has a circular cross section and wherein the head is larger than the stem, wherein the holder element is provided with an opening adapted to allow insertion of the head through the opening and to allow connection of the holder element to the knob, and wherein the sheet holding arrangement is connected or connectable to a pulling arrangement configured to pull the holder elements and thereby move the sheet and thus transfer a patient placed on the sheet, wherein the sheet holding arrangement comprises a connecting member that is a rod, wherein the at least two knobs are arranged onto and integral with the connecting member at a distance from each other in a longitudinal direction of the connecting member, wherein the stem comprises a circumferentially extending rounded groove, wherein the opening comprises a first portion that is larger than the head and a second portion that is smaller than the head, wherein the second portion comprises a straight section and a semi-circular end section, wherein the semi-circular end section has a rounded bulging surface with a shape corresponding to that of the rounded shape of the groove of the stem such that, when a sheet is placed above the knob and the corresponding holder element is connected to the knob with the sheet positioned between the knob and the holder element, and when the position of the holder element in relation to the knob is such that the stem is located as close as possible to the semi-circular end section of the second portion of the opening, the sheet is clamped between the rounded bulging surface and the rounded groove along the semi-circular end section; wherein the holder element comprises at least one strap slot adapted to secure the holder element to the sheet holding arrangement connecting member by a flexible ribbon; wherein, when the holder element is locked onto the groove and a pulling opening of the holder element is connected to the pulling arrangement, the at least one strap slot and the pulling opening are positioned distal to the patient relative to the locked onto groove.

2. The sheet holding arrangement according to claim 1, wherein the straight section of the second portion comprises at least one protrusion.

3. The sheet holding arrangement according to claim 1, wherein a height of the groove equals a thickness of the holder element.

4. The sheet holding arrangement according to claim 1, wherein the holder element comprises a pulling opening adapted to be connected to a pulling arrangement.

5. The sheet holding arrangement according to claim 4, wherein the pulling opening is positioned at the end opposite the semi-circular end section of the holder element.

6. The sheet holding arrangement according to claim 1, wherein the holder element is flat with a thickness between 2 to 10 mm.

7. The sheet holding arrangement according to claim 1, wherein the sheet holding arrangement comprises at least three knobs and at least three holder elements.

8. A patient transfer device for transferring a patient placed on a movable sheet from a first surface to a receiving surface, the patient transfer device comprising: a sheet holding arrangement according to claim 1, wherein the patient transfer device further comprises a pulling arrangement provided with two pulling wires each being structured and positioned to attach to different ones of the at least two knobs connected to the sheet holding arrangement.

9. The patient transfer device according to claim 8, wherein the patient transfer device comprises at least one motor operatively connected to the pulling wires so as to allow retraction of the sheet holding arrangement.

10. The patient transfer device according to claim 8, wherein the patient transfer device is mounted on a frame provided with wheels.

11. The patient transfer device according to claim 10, wherein the sheet pulling arrangement is mounted on the frame in a height adjustable manner.

12. The patient transfer device according to claim 8, wherein the patient transfer device is mounted on an adjustable wall mounted arm.

13. The sheet holding arrangement according to claim 1, wherein the two of the at least two knobs are located at opposite ends of the connecting member.

14. The sheet holding arrangement according to claim 1, wherein a radius of a widest part of the knob is larger than a radius of a widest part of the groove.

15. The sheet holding arrangement according to claim 1, wherein the pulling arrangement can reversibly hook into a pulling opening of the holder element including when the connecting member is already connected to a sheet.

* * * * *